United States Patent [19]

Matthews

[11] Patent Number: 5,341,034
[45] Date of Patent: Aug. 23, 1994

[54] BACKUP BATTERY POWER CONTROLLER HAVING CHANNEL REGIONS OF TRANSISTORS BEING BIASED BY POWER SUPPLY OR BATTERY

[75] Inventor: Wallace E. Matthews, Richardson, Tex.

[73] Assignee: Benchmarq Microelectronics, Inc., Carrollton, Tex.

[21] Appl. No.: 16,440

[22] Filed: Feb. 11, 1993

[51] Int. Cl.$^5$ .............................. H02J 9/02
[52] U.S. Cl. ................... 307/296.1; 307/66; 307/296.2; 307/355
[58] Field of Search ............... 257/392, 393, 204, 206, 257/208, 351, 124, 173; 307/296.1, 296.2, 296.5, 296.8, 350, 355, 362, 66, 572; 365/229

[56] References Cited

U.S. PATENT DOCUMENTS

| | | |
|---|---|---|
| 3,859,638 | 2/1975 | Hume, Jr. . |
| 4,122,359 | 10/1978 | Breikss . |
| 4,381,458 | 4/1983 | Anstey et al. . |
| 4,422,163 | 12/1983 | Oldenkamp . |
| 4,451,742 | 5/1984 | Answell . |
| 4,458,307 | 7/1984 | McAnlis et al. . |
| 4,617,473 | 10/1986 | Bingham ........................ 307/66 |
| 4,645,943 | 2/1987 | Smith, Jr. et al. . |
| 4,713,555 | 12/1987 | Lee ................................. 307/66 |
| 4,730,121 | 3/1988 | Lee et al. . |
| 5,099,146 | 3/1992 | Miki et al. ................... 307/296.2 |
| 5,157,291 | 10/1992 | Shimoda ....................... 307/355 |
| 5,241,508 | 8/1993 | Berenguel et al. ............... 307/66 |

Primary Examiner—Timothy P. Callahan
Assistant Examiner—Toan Tran
Attorney, Agent, or Firm—Ross, Howison, Clapp & Korn

[57] ABSTRACT

A power control circuit (10) is operable to select between a backup battery (14) on a terminal (16) and a primary power supply voltage on a terminal (12) to output a voltage to a powered device (20). The two voltages are compared by a comparator (28) that drives a well bias node (44) with transistors (36) and (38). The comparator (28) selects the highest of two voltages on either the battery supply terminal (16) or the power supply terminal (12) to power the node (44), which node (44) is then connected to the wells of switching transistors (40) and (42) which are operable to select the battery terminals (16) in the event of a fail of the power supply on terminal (12). This decision is made with a power failure device (20). In the event that both the primary power supply voltage falls below a predetermined threshold and the battery supply voltage is at a higher level, the battery (14) is selected for output on the line (18).

6 Claims, 2 Drawing Sheets

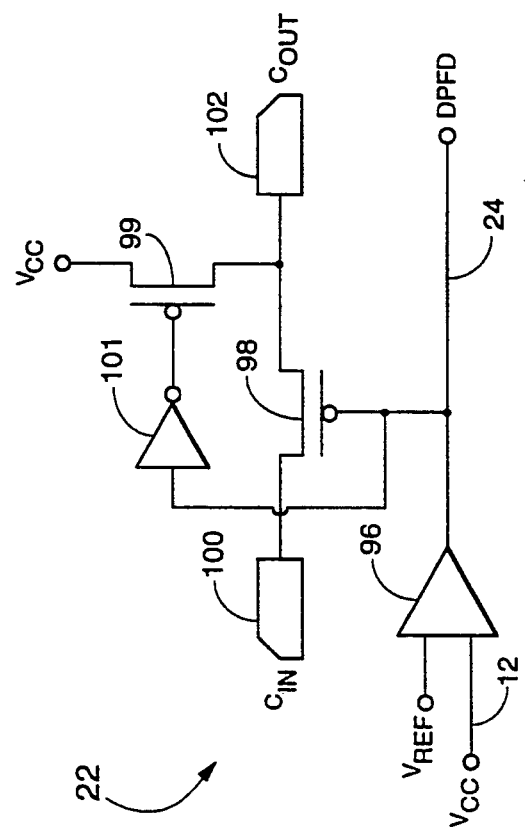
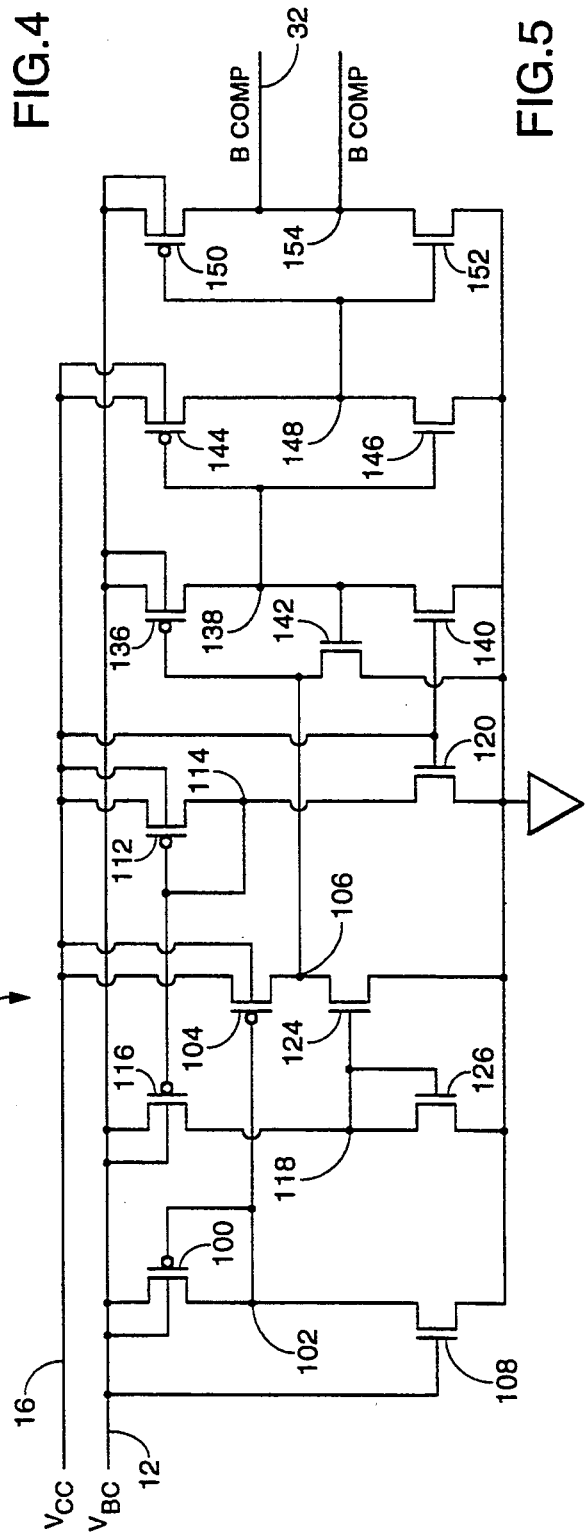
FIG.4
FIG.5

BACKUP BATTERY POWER CONTROLLER HAVING CHANNEL REGIONS OF TRANSISTORS BEING BIASED BY POWER SUPPLY OR BATTERY

TECHNICAL FIELD OF THE INVENTION

The present invention pertains in general to power controllers, and more particularly, to a power controller that selects the highest of multiple input voltages thereto for the purpose of biasing the wells of the switching transistors independent of which supply is selected for providing output power.

CROSS REFERENCE TO RELATED APPLICATION

This patent application is related to U.S. patent application Ser. No. 07/523,976, filed May 16, 1990, and entitled "Integrated Power Controller" and U.S. patent application Ser. No. 07/704,068, filed May 22, 1991, and entitled "Differential Comparator Powered from Signal Input Terminals for Use in Power Switching Applications".

BACKGROUND OF THE INVENTION

Power controllers have been utilized in battery backed-up systems to switch in a backup battery in the event that a primary power supply fails. Specifically, a comparator is utilized that compares the primary power supply voltage to a reference voltage. In the event that the voltage of the primary power supply falls below this reference voltage, a signal is generated that causes a backup battery to be switched in. Whenever the voltage of the primary power supply rises above the threshold voltage, the primary power supply is again switched over to the output of the power controller. However, these systems work on the premise that the voltage of the primary power supply voltage and the threshold voltage at which the decision is made is always above the voltage level of the battery. These systems generally utilize a lithium battery that has a voltage of around three volts, with the primary power supply having a voltage of around five volts. The threshold for making the determination as to the primary power supply being low is approximately 4.5 volts. One disadvantage to present systems is that they do not take into consideration low voltage operating modes, wherein the primary power supply voltage is approximately equal to the backup battery voltage. In such a situation, the fully charged battery could have a voltage level higher than the power supply voltage.

Whenever a system utilizes a backup battery that may have a voltage higher than the primary power supply voltage, there always exists a possibility that, during normal operating mode with the primary power supply, a current path will exist between the backup battery and the primary power supply, thus draining current from the backup battery. This occurs due to the fact that the switching transistors utilized in the semiconductor structure typically share a common source with the drains of the switching transistors connected to the respective power supply. Typically, the sources and drains of transistors are fabricated from one conductivity type semiconductor material whereas the channel regions and the surrounding semiconductor material is fabricated from a second and opposite conductivity type of material in a common region. If the drain of the transistor associated with the primary power supply were disposed at a lower voltage than the drain of the transistor associated with the backup battery, a forward biased PN junction could exist. For example, a switching transistor with P-channel transistors fabricated in a PMOS type device would require an N-type well being formed within a P-type substrate. Within the N-type well, sources and drains would be fabricated from P-type impurity implants. Typically, an N+ impurity implant is utilized within the well to provide a contact region to allow a bias to be supplied thereto. This region is typically connected to the power supply voltage provided to the system. If this voltage were lower than any of the P-type implants, such as the drain implant of the transistor associated with the backup battery during operation from the primary power supply, a forward biased PN junction would result at the interface between the drain implant associated with the backup battery power supply and the well, this being connected directly to the N+ implant that is connected to the power supply. As a result, a current path would be provided from the battery, which is at a higher voltage, to the primary power supply, thus draining the backup battery into the primary power supply, causing an unnecessary loss of current.

SUMMARY OF THE INVENTION

The present invention disclosed and claimed herein comprises a power supply device for selecting between a primary power supply and a backup power supply to provide power on an output terminal to then provide power to a circuit device. The power supply device includes a power fail device for comparing the voltage on the primary power supply to the voltage on the backup supply and determining when the primary power supply voltage falls below a predetermined voltage threshold. A power fail signal is generated in response to the voltage on the primary power supply falling below the predetermined voltage threshold. A switching device is operable to connect the primary power supply to the output terminal in the absence of the power fail signal, and is operable to connect the backup power supply to the output terminal in response to the generation of the power fail signal. The switching device is comprised of first and second MOS transistors, each having a channel region formed of a first conductivity type semiconductor material. The first MOS transistor has source/drain regions disposed on opposite sides of the channel region and fabricated from a second conductivity type material opposite to the first conductivity type material. A gate electrode is disposed over the channel and is connected to a first control signal. The second MOS transistor has two source/drain regions of the second conductivity type material disposed on opposite sides of the associated channel region with a gate electrode disposed over the channel region and connected to a second control signal. The source/drain path of the first MOS transistor is connected between the output terminal and the primary power supply device, and the source/drain path of the second MOS transistor is connected between the backup power supply and the output terminal. A control device is operable to generate the first and second control signals such that the first MOS transistor conducts in the absence of the power fail signal, and the second MOS transistor conducts in the presence of the power fail signal. A channel bias circuit is provided for biasing the channel regions of the first and second MOS transistors to the higher of the primary power supply or the backup power supply.

In another aspect of the present invention, the channel bias circuit includes a comparator for comparing the voltage of the primary power supply to the voltage of the backup power supply. A first comparator output signal is generated when the voltage of the primary power supply is greater than the voltage of the backup power supply. A second comparator output signal is generated when the voltage of the backup power supply is greater than the voltage of the primary power supply. Fourth and fifth MOS transistors are provided that are operable to connect either the voltage of the primary power supply to a bias node or the voltage of the backup power supply to the bias node. The third and fourth MOS transistors each have a channel region fabricated of the first conductivity type semiconductor material with source/drain regions disposed on either side of the respective channel regions, the source/drain regions fabricated of the second conductivity type material. Each of the third and fourth MOS transistors has a gate electrode disposed over the associated channel region, the gate electrode of the third MOS transistor connected to the first comparator output signal and the gate of the fourth MOS transistor connected to the second comparator output signal. Therefore, the third MOS transistor conducts in the presence of the first comparator output signal to connect the voltage of the primary power supply to the bias node whenever the voltage of the primary power supply is greater than the voltage of the backup power supply, and the fourth MOS transistor conducts whenever the voltage of the backup power supply is greater than the voltage of the primary power supply to connect the voltage of the backup power supply to the bias node. The bias node is connected to the channel regions of the first and second MOS transistors. Additionally, the voltage on the bias node is connected to the channel regions of the third and fourth MOS transistors.

In yet another aspect of the present invention, the power fail device is operable to inhibit generation of the power fail signal unless the second comparator output signal is generated indicating that the backup power supply voltage is greater than the primary power supply voltage. The power fail device includes driving logic circuitry for driving the gates of the first and second MOS transistors. The driving logic circuitry is powered from the bias node.

BRIEF DESCRIPTION OF THE DRAWINGS

For a more complete understanding of the present invention and the advantages thereof, reference is now made to the following description taken in conjunction with the accompanying Drawings in which:

FIG. 4 illustrates a logic diagram of the power fail device; and

FIG. 5 illustrates a logic diagram of the low power comparator.

DETAILED DESCRIPTION OF THE INVENTION

Figure 1:
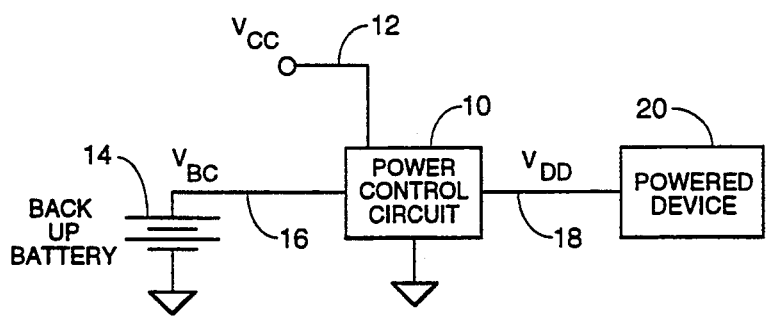
FIG. 1 illustrates an overall block diagram power control circuit for supplying power to a powered device.

Referring now to FIG. 1, there is illustrated a generalized block diagram of a power control circuit 10 that is operable to receive power from a primary power supply $V_{CC}$ on a line 12, and power from a backup battery 14 on a line 16. The power control circuit 10 is operable to determine if the primary power supply on line 12 is greater than or less than an internal reference voltage (not shown). If the primary power supply voltage $V_{CC}$ on the input terminal 12 is less than the internal reference voltage, this indicates a low power supply condition or loss of power supply, and the backup battery 14 on the terminal 16 voltage $V_{BC}$ is selected for output to a line 18 labelled $V_{DD}$ (only if $V_{CC}$ is less than $V_{BC}$). Voltage $V_{DD}$ on the output 18 is input to a powered device 20. The powered device 20 can be any type of integrated circuit device which is either integral with the power supply circuit 10 or disposed on a separate chip. For example, the powered device 20 could be a memory device such as a Static Random Access Memory (SRAM) that requires power to be applied thereto to maintain the integrity of the stored data. A number of other devices could also be implemented in the powered device 20.

Figure 2:
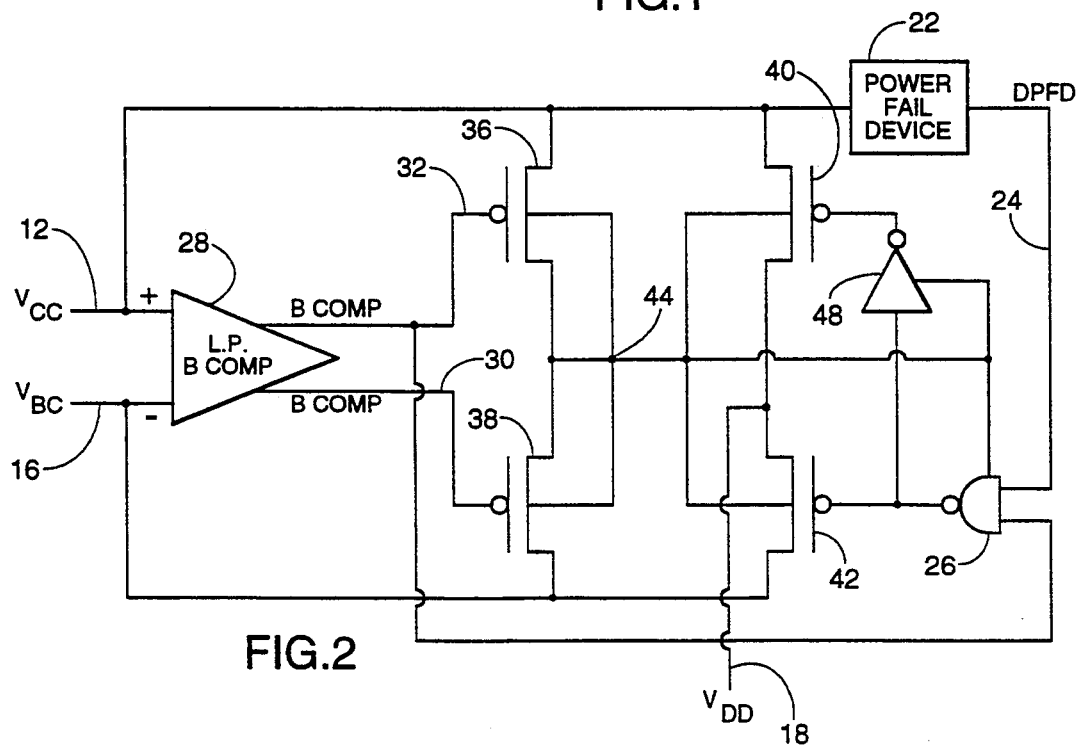
FIG. 2 illustrates a detailed logic diagram of the power control circuit.

Referring now to FIG. 2, there is illustrated a detailed schematic diagram of the power control circuit 10 of the present invention. The primary power supply terminal 12 is input to a power fail device (PFD) 22, the power fail device operable to output the control signal DPFD on a line 24. This is input to one input of a NAND gate 26. The voltage on the $V_{CC}$ terminal 12 is also input to the positive input of a low power comparator 28, the negative input thereof connected to the battery terminal 16 have the voltage $V_{BC}$ disposed thereon. The low power comparator 28 is operable to receive the power supply voltage thereof powering voltage therefor from the highest voltage one of the terminals 12 and 16 in order to make a decision as to which of the voltages is higher. The comparator 28 provides two outputs, a first output on a line 30 labelled BCOMP and a second output on a line 32 labelled BCOMP-Bar. The output on terminal 30 is a logic "high" when the voltage $V_{CC}$ on terminal 12 is greater than the voltage $V_{BC}$ on terminal 16. The logic state on the line 32 is a logic "high" when the voltage $V_{BC}$ on terminal 16 is greater than the voltage $V_{CC}$ on terminal 12. The comparator 28 is described in U.S. Patent Application Ser. No. 07/704,068, filed May 22, 1991, which reference is incorporated herein by reference.

Two sets of switching transistors are provided, a first set comprised of a P-channel transistor 36 and a P-channel transistor 38, and a second set comprised of a P-channel transistor 40 and a P-channel transistor 42. The first set of transistors 36 and 38 are utilized to provide the switching operation for the well bias to provide the appropriate bias for the power control circuit 10, and the second set of transistors 40 and 42 utilized to select the voltage $V_{DD}$ from either the $V_{CC}$ terminal 12 or the $V_{BC}$ terminal 16. The transistor 36 has the source/drain path thereof connected between the $V_{CC}$ terminal 12 and a well-bias node 44 and the gate thereof connected to the comparator output terminal 32. The transistor 38 has the source/drain path thereof connected between the $V_{BC}$ terminal 16 and the well bias node 44, and the gate thereof connected to the comparator output terminal 30. The node 44 provides the well bias for the transistors 36 and 38 and also for the transistors 40 and 42.

Whenever terminal 32 is at a logic "low" and the output on line 30 is at a logic "high", indicating a condition wherein $V_{CC}$ is greater than $V_{BC}$, transistor 36 conducts to connect the voltage $V_{CC}$ to the node 44, and therefore disposes the nodes 44 at the voltage $V_{CC}$. Alternatively, whenever the voltage on the comparator output 32 is at a logic "high", and the comparator output on line 30 is at a logic "low", transistor 38 will conduct and dispose the bias node 44 at the voltage $V_{BC}$, indicating the condition wherein $V_{BC}$ is greater than $V_{CC}$.

The transistor 40 has the source/drain path thereof disposed between the $V_{CC}$ terminal 12 and the $V_{DD}$ line 18 and the gate thereof connected to the output of an inverter 48, the input thereof connected to the output of the NAND gate 26. The transistor 42 has the source/drain path thereof connected between the $V_{BC}$ terminal 16 and the $V_{DD}$ output 18, and the gate thereof connected to the output of the NAND gate 26. The transistors 40 and 42 thereof determine which of the voltage terminals 12 or 16 is connected to the output terminal 18, to provide power to the powered device 20.

The transistor 40 typically conducts whenever the voltage $V_{CC}$ on terminal 12 is determined by the power fail device to be greater than an internal threshold. Under this condition, the logic signal on the line 24 is a logic "low", resulting in the output of the NAND gate 26 being at a logic "high" and the gate of transistor 40 being at a logic "low". Whenever the voltage $V_{CC}$ falls below the internal threshold in the power fail device 22, the logic state on the line 24 goes to a logic "high". However, the output of the NAND gate 26 does not change logic states until the logic state on the comparator output line 32, BCOMP-bar, goes high, indicating that the voltage $V_{BC}$ is greater than the voltage $V_{CC}$. When both of these conditions exist, the output of the NAND gate 26 goes to a logic "low", turning on transistor 42 and turning off transistor 40. This provides the voltage $V_{BC}$ on the output 18 and the voltage $V_{DD}$. Therefore, the voltage $V_{BC}$ on the terminal 16 will only be connected to the output terminal 18 when both the voltage $V_{CC}$ on line 12 falls below a predetermined threshold voltage and the voltage $V_{CC}$ is less than the voltage $V_{BC}$. During all operations, the well of all of the switching transistors 36, 38, 40 and 42 are connected to the highest voltage of the two voltages $V_{CC}$ and $V_{BC}$ rather than the selected one that is output to the line 18. Additionally, the power supply voltage to the NAND gate 26 and to the inverter 48 is also connected to the well bias node 44, such that the logic state will always be the highest voltage in the system, to ensure that the switching transistors 36, 38, 40 and 42 will always be disposed at the highest voltage in the system.

Figure 3:
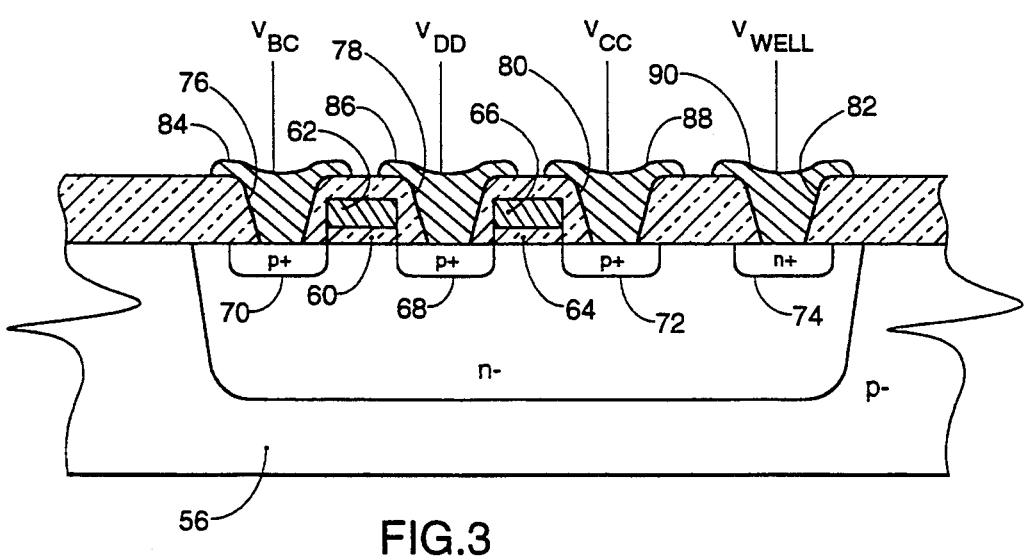
FIG. 3 illustrates a cross-sectional view of the structure of the switching transistor illustrating the separate well-bias connection.

Referring now to FIG. 3, there is illustrated a cross-sectional diagram of either the transistor pair 36 and 38 or the transistor pair 40 and 42. A substrate 56 of a P-type conductivity is provided, the doping level being of a P- concentration, i.e., lightly doped. A CMOS process is utilized wherein an N-type well 58 is formed in the surface of the substrate 56 and driven to a predetermined depth. Thereafter, an oxide layer is formed on the surface of the N-well 58, followed by the deposition of a layer of polycrystalline silicon. This combined layer of polycrystalline silicon and oxide is then patterned to form two gate electrodes/gate oxide structures, one having a gate oxide layer 60 and a gate electrode 62 and one having a gate oxide layer 64 and a gate electrode 66. These two structures are disposed a predetermined distance apart. After patterning, a self-aligned technique, which is conventional in the art, is used to form source/drain regions. In this procedure, P-type impurities are implanted into the substrate with the edges of the gate electrodes 62 and 66 defining the edge of the channels that lie therebelow. In this procedure, a common source region 68 is formed between the two gate electrodes 62 and 66 with a drain region 70 formed on the opposite side of the gate electrode 62 from the source region 68, and a drain region 72 formed on the opposite side of the gate electrode 66 from the source region 68. In this manner, two P-channel transistors have been formed, one comprising the drain region 70, the source region 68 and the gate electrode 62, and one comprising the drain region 72, the common source region 68 and the gate electrode region 66.

After formation of the source and drain regions, an N-type implant is performed to provide an N-type region 74 of a higher concentration than the N-type material in the well 58. This provides a contact for a separate metal interconnect layer to the N-type well 58, as the low concentrations in the N-type well 58 are not conducive to forming a contact thereon. It should be noted that the N+ region 74 is disposed apart from the P-type source/drain regions 68, 70 and 72.

After formation of the N+ contact 74, a layer of interlevel oxide (ILO) is deposited over the substrate and then vias formed therethrough to contact the regions 70–74. This results in a via 76 being formed over the region 70, a via 78 being formed over the region 68, a via 80 being formed over the region 72 and a via 82 being formed over the region 74. After formation of the vias 76–82, a layer of metal, such as aluminum, is deposited in a conformal manner over the substrate and then patterned and etched to form contacts 84, 86, 88 and 90 in the vias 76, 78, 80 and 82, respectively. In the structure of FIG. 3, the contact 84 is connected to the voltage $V_{BC}$, the contact 86 is connected to the voltage $V_{DD}$, the contact 88 is connected to the voltage $V_{CC}$ and the contact 90 is connected to the voltage well potential $V_{WELL}$, which is disposed on node 44.

The structure of FIG. 3 is utilized to realize the transistors 40 and 42 with the contacts 90 being connected to the common source region 68 of transistors 36 and 38. With the structure of FIG. 3 utilized to form the transistors 36 and 38, the common source region 68 would comprise the node 44 and also would be connected to the region 74 and the contact 90. It can be seen from the structure of FIG. 3 that if the voltage $V_{BC}$ were higher than the voltage of the well 58, a forward biased PN junction would exist between the region 70 and the well 58, which would allow current to pass to the well 58 and then to the contact region 74. If the metal contact 90 were connected to the voltage $V_{CC}$, this would allow current to flow from the battery terminal $V_{BC}$ to the power supply terminal $V_{CC}$.

Referring now to FIG. 4, there is illustrated a logic diagram of the power fail device 22. A comparator 96 is provided having a positive input terminal and a negative input terminal and an output terminal connected to the terminal 24 to provide the DPFD output signal. The voltage $V_{CC}$ on terminal 12 is connected to the negative input of the comparator 96 and the internal reference voltage $V_{REF}$ is connected to the positive input terminal. Whenever the voltage $V_{CC}$ is above the voltage $V_{REF}$, the output of comparator 96 is at a logic "low"-

'voltage. Whenever the voltage $V_{CC}$ is below the voltage $V_{REF}$, the output of the comparator 96 is at a logic "high" level, indicating a failure mode. Additionally, a P-channel transistor 98 is provided, having the gate thereof connected to the output of the comparator 96 and the source/drain path thereof connected between a control input terminal 100 and a control output terminal 102. A pullup transistor 99 has the source-to-drain path thereof connected between $V_{CC}$ and the control output terminal 102, and the gate thereof connected through an invertor 101 to the gate of the transistor 98. This allows a control signal to be passed through to the powered device 20. This is utilized for such things as Chip Enable signals for memories to be connected to the powered device 20. This would be utilized in applications such as a battery backed up memory.

Referring now to FIG. 5, there is illustrated a detailed schematic diagram of the low power comparator 28. The low power comparator is made of two differential comparators. The first differential comparator is comprised of a P-channel transistor 100 having the drain thereof connected to the primary power supply node 12 and the source thereof connected to a node 102. The gate of transistor 100 is also connected to the node 102. A P-channel transistor 104 has the drain thereof connected to the backup power supply node 16, the source thereof connected to a node 106 and the gate thereof connected to a node 102. The node 102 is connected through the source/drain path of an N-channel transistor 108 to ground, the gate of transistor 108 connected to the voltage $V_{CC}$ on node 112 as a bias voltage.

The source/drain path of transistor 104 is connected through the source/drain path of the transistor 124, the gate thereof connected to a bias node 118. The source of transistor 104 is also connected to a node 106 which comprises the output node of the comparator formed by the transistors 100, 104, 108 and 124.

A second differential comparator is comprised of a P-channel transistor 116 having the drain thereof connected to the $V_{CC}$ node 12, the source thereof connected to the bias node 118 and the gate thereof connected to a node 114. A P-channel transistor 112 has the gate thereof connected to the $V_{BC}$ node 16, the source thereof connected to the node 114 and the gate thereof connected to the node 114. The node 118 is connected through the source/drain path of an N-channel transistor 126 to ground, the gate of transistor 126 connected to the node 118. Similarly, the source of transistor 112 is connected through the source/drain path of an N-channel transistor 120 to ground, the gate of transistor 120 connected to the $V_{BC}$ terminal 16.

The node 106 comprises a single ended output, which is connected to the gate of a P-channel transistor 136, transistor 136 having the source-drain path thereof connected between the $V_{CC}$ node 12 and a node 138. The node 138 is connected through the source/drain path of an N-channel transistor 140 to ground. The gate of transistor 140 is connected to the $V_{BC}$ node 16 such that transistor 140 is controlled by the voltage $V_{BC}$. Transistors 136 and 140 form a first invertor having the input thereof connected to node 106. The node 106 is connected through the source/drain path of an N-channel transistor 142 to ground, the gate of which is connected to the node 138. The transistor 142 provides a hysteresis operation.

Node 138 is connected to the gate of a P-channel transistor 144 and the gate of an N-channel transistor 146, transistors 144 and 146 forming a second invertor.

The source/drain path of transistor 144 is connected between the $V_{BC}$ node 16 and a node 148, and the source/drain path of transistor 146 is connected between node 148 and ground. Node 148 is input to the gates of a P-channel transistor 150 and an N-channel transistor 152. The source/drain path of transistor 150 is connected between the $V_{CC}$ node 12 and a node 154 and the source/drain path of the transistor 152 is connected between a node 154 and ground. Transistors 150 and 152 comprise a third invertor with node 154 comprising the output BCOMP-Bar and node 148 comprising the output BCOMP.

In summary, there have been provided a battery power control circuit that is operable to supply a high integrity voltage to a separate powered device. The voltage is selected from either an external power supply or a battery backup device. The primary power source is derived from the external power supply with the battery backup device chosen only in the event of failure of the primary power supply. The voltage of the primary power supply is first compared to an internal voltage threshold to ensure when it falls below that voltage. Further, the battery voltage is compared to the primary power supply voltage to determine that it is higher than the primary power supply voltage when the primary power supply voltage falls below the threshold. In this condition, the system is then switched to the battery backup device and the battery backup device is utilized to provide power to the powered device. In order to insure that the power control circuit is operating correctly, the primary power supply voltage and the battery voltage are compared to determine which of the two is higher. The higher voltage is then selected for biasing the wells of the transistors for the switching operation to the higher of the two voltages, regardless of which voltage is selected to power the external powered device. In this manner, current is prevented from flowing from the battery backup device terminal to the primary power supply terminal when the primary power supply terminal is selected.

Although the preferred embodiment has been described in detail, it should be understood that various changes, substitutions and alterations can be made therein without departing from the spirit and scope of the invention as defined by the appended claims.

What is claimed is:

1. A power supply device for selecting between a primary power supply and a backup power supply to provide power on an output terminal to a powered device, comprising:

a power fail device for comparing the voltage on the primary power supply to an internal threshold voltage and generating a power fail signal when the voltage of the primary power supply falls below said internal threshold voltage;

a switching device for connecting either the primary power supply or the backup power supply to the output terminal, said switching device having:

a first MOS transistor having a channel region of a first conductivity type material and a source/drain region on either side thereof, said source/drain region of a second conductivity type material opposite to said first conductivity type material, said first MOS transistor having a gate electrode disposed over said channel region and connected to a first control signal with the source/drain path of said first MOS transistor connected between the primary power supply and the output terminal, a second MOS transistor having a channel region of said first conductivity type material and a source/drain region on either side of said channel region of said second conductivity type material and a gate electrode disposed over said channel region and connected to a second control signal, the source/drain path of said second MOS transistor connected between the backup power supply and the output terminal, said channel regions of said first and second MOS transistors in a common region of first conductivity material, a control device for generating said first and second control signals in response to receiving said power fail signal such that said first MOS transistor conducts in the absence of said power fail signal and said second MOS transistor conducts in the presence of said power fail signal, and a channel bias circuit for biasing said channel regions of said first and second MOS transistors to the higher voltage one of said primary power supply or the backup power supply.

2. The power supply device of claim 1, wherein said channel bias circuit comprises:

a comparator for comparing the voltage of the backup power supply and the voltage of the primary power supply and generating a first comparator output signal when the primary power supply is greater than the backup power supply, and a second comparator output signal when the voltage of the backup power supply is greater than the voltage of the primary power supply;

a third MOS transistor having a channel region of said first conductivity type material, a source/drain region of said second conductivity type on either side of said channel region and a gate electrode disposed over said channel region and connected to said first comparator output signal and operable to turn on said third MOS transistor in response to the generation of said first comparator signal, the source/drain path of said third MOS transistor connected between the primary power supply and a channel bias node; and a fourth MOS transistor having a channel region of said first conductivity type, a source/drain region of said second conductivity type on either side of said channel region and a gate electrode disposed over said channel region and connected to said second comparator output signal and operable to turn on said fourth MOS transistor in the presence of said second comparator output signal, the source/drain path of said fourth MOS transistor connected between the backup power supply and said channel bias node;

said channel bias node connected to said channel regions of said first and second MOS transistors.

3. The power supply device of claim 2, wherein said channel regions of said third and fourth MOS transistors are formed in a common region and are biased by the voltage on said channel bias node.

4. The power supply device of claim 2, wherein said power fail device is operable to inhibit the generation of said power fail signal unless said second comparator output signal is generated.

5. The power supply device of claim 4, wherein said power fail device includes logic drawing circuitry for generating said power fail signal, said logic driving circuitry powered from the voltage on said channel bias node.

6. The power supply device of claim 1, wherein the source/drain region of said first and second MOS transistors connected to said output terminal comprises a common source region of said second conductivity type material.

* * * * *

UNITED STATES PATENT AND TRADEMARK OFFICE
CERTIFICATE OF CORRECTION

PATENT NO. : 5,341,034
DATED : August 23, 1994
INVENTOR(S) : Wallace E. Matthews It is certified that error appears in the above-indentified patent and that said Letters Patent is hereby corrected as shown below:

Column 10, Claim 5, line 29, replace "drawing" with --driving--.

Signed and Sealed this

Twenty-second Day of November, 1994

Attest:

BRUCE LEHMAN

*Attesting Officer*      *Commissioner of Patents and Trademarks*